(No Model.)
E. G. CRAWFORD.
LOCKING DEVICE FOR CHAIN PUMPS, &c.
No. 470,551. Patented Mar. 8, 1892.
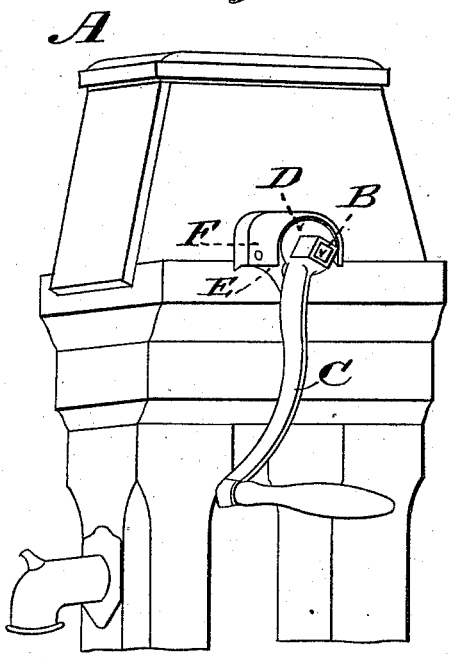
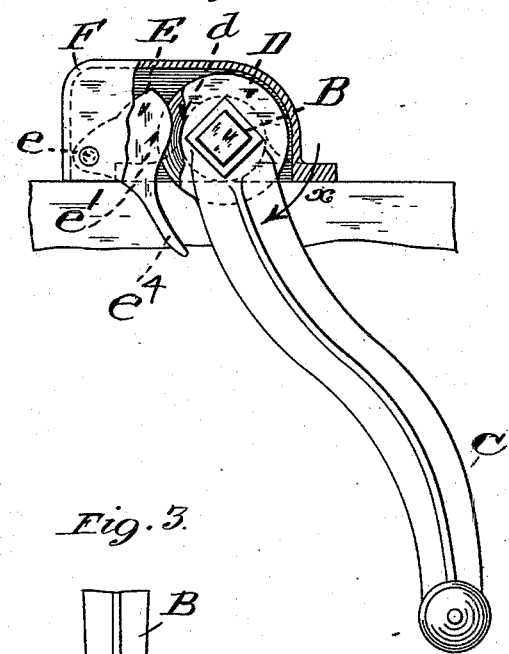
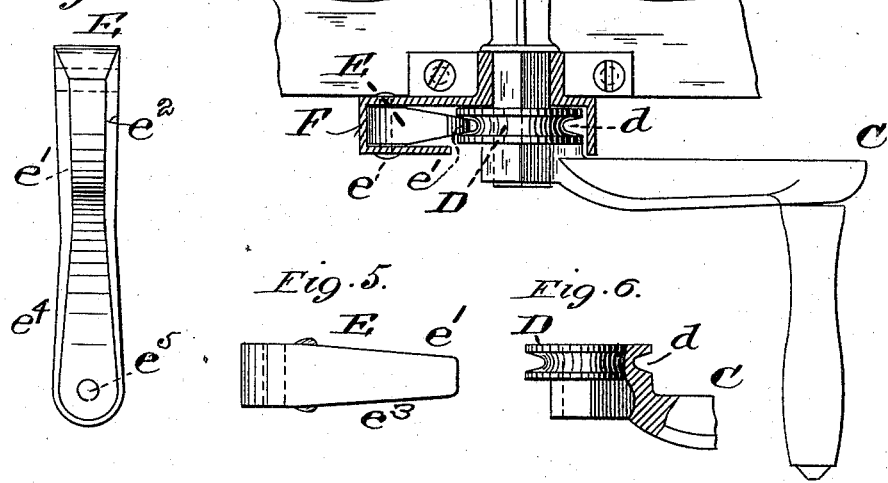
WITNESSES
Edward W Purrell
J. W. Crawford
INVENTOR
Edwin G. Crawford
by C. D. Moody
his atty

UNITED STATES PATENT OFFICE.

EDWIN G. CRAWFORD, OF ST. LOUIS, MISSOURI, ASSIGNOR TO THE N. O. NELSON MANUFACTURING COMPANY, OF SAME PLACE.

LOCKING DEVICE FOR CHAIN-PUMPS, &c.

SPECIFICATION forming part of Letters Patent No. 470,551, dated March 8, 1892.

Application filed July 14, 1891. Serial No. 399,503. (No model.)

*To all whom it may concern:*

Be it known that I, EDWIN G. CRAWFORD, of St. Louis, Missouri, have made a new and useful Improvement in Chain-Pump and other Fixtures, of which the following is a full, clear, and exact description.

The mechanism under consideration is a substitute for the ordinary pawl-and-ratchet construction used to prevent a backward movement of a crank-shaft when released. It is not only less noisy in use than the ratchet mechanism referred to, but is further desirable in that it is more prompt in its arrestive action, more reliable, stronger, and perhaps less liable to interference from dirt and ice, all substantially as is hereinafter described and claimed, aided by the annexed drawings, making part of this specification, in which—

Figure 1 is a view in perspective showing the upper portion of a chain-pump curb having the improvement; Fig. 2, a side elevation, partly in section, of the improved device. The view includes the crank. Fig. 3 is a sectional plan of the parts of Fig. 2; Figs. 4 and 5, an edge view and a top view, respectively, of the wedge; and Fig. 6, a view of the disk with which the wedge coacts. It is shown attached to the crank.

The views are not all on the same scale.

The same letters of reference denote the same parts.

The improvement being well adapted to a chain-pump, mechanism is illustrated in connection therewith, A representing the ordinary curb of a chain-pump; B, the usual shaft, journaled in the curb, and C the crank applied to said shaft.

D represents a grooved disk, which takes the place of the ratchet of a pawl-and-ratchet mechanism. This disk is preferably made in one piece with the crank, substantially as shown in Fig. 6. The groove $d$ extends around the disk and it narrows inwardly.

E represents a part which may be styled a "wedge" or "binding-block" and which coacts with the disk, it being pivoted at $e$ to some fixed part of the structure—say to the housing F—and its tapered end or point $e'$ being adapted to enter the groove in the disk. When the crank is turned to elevate the water, as in the direction indicated by the arrow $x$, the point $e'$ rides loosely in the disk-groove; but should the crank tend to rotate backward the point $e'$ wedges into the disk-groove, and the crank and other parts of the construction commanded by the crank are prevented from turning backward. This result is due partly to the fact that the pivot $e$, the center of the crank-shaft, and the point of contact of the wedge E with the disk are nearly in line when the crank is being rotated in a forward direction, and that they tend to come more into line when the crank tends to turn backward. The result, however, is materially promoted by reason of the manner in which the wedge coacts with the disk. In place of being a flat part bearing upon a flat surface, the wedge at its point of contact with the disk is, as described, tapered to fit into a correspondingly-tapered groove in the disk. Provision is thus made for binding the wedge-point laterally as well as vertically against the disk. Any irregularity in the construction and arrangement of the parts (for instance, suppose the disk to have a flat surface and axis of the pivot $e$ to be sufficiently out of parallel with the crank-shaft to cause a corner only of the wedge to encounter the disk) is not likely to prevent the proper coaction of the disk with the wedge. Even should the wedge be loose upon its pivot and incline to turn sidewise thereon, its point will readily come to a bearing between the sides of the disk-groove and the disk and crank-shaft to be held from turning backward.

To carry out the improvement in its best form, the wedge-point is tapered vertically downward, substantially as shown at $e^2$ in Fig. 4, and it also widens from its point in the direction of its pivot $e$, substantially as shown at $e^3$, Fig. 5. The point is also rounded, substantially as shown in side elevation in Fig. 2. The described vertical taper promotes the wedging action in the downward movement of the wedge-point, and it is useful even when the groove in the disk does not taper inward, as described, and it is especially useful in combination with a tapered groove. The other-described taper of the wedge—namely, from the direction of the pivot $e$—is also useful, although the groove in the disk is not tapered, and it is particularly beneficial in connection with the disk-groove tapered as described. The wedge is suitably weighted to cause it to drop promptly against the disk, and it may have an extension $e^4$, which may serve as a handle when it is desired to lift the wedge, and said extension may be perforated, as at $e^5$, to enable a tie to be readily applied thereto for any purpose.

As illustrated, the disk D is shown held in position by being part of the crank, which in turn is applied to the shaft B. Said disk, however, may be applied to said shaft in any other suitable manner to rotate therewith, and said shaft may be any shaft whose backward movement is capable of being arrested by means of a grooved disk and a coacting pivoted wedge, substantially as described.

I claim—

The combination of the shaft having a disk provided with a tapered groove, with the wedge-shaped binding-block E, having its point rounded and tapered and provided with the downwardly-extending handle $e^4$, integral therewith, the center of the shaft and the point of contact of the wedge with the disk being nearly in line when the binding-block is in engagement with the disk, all substantially as described.

Witness my hand this 9th day of July, 1891.

EDWIN G. CRAWFORD.

Witnesses:
C. D. MOODY,
A. BONVILLE.